G. CAMPOS.
MEANS FOR THE PROTECTION OF ELECTRICAL INSTALLATIONS FROM EXCESS VOLTAGES.
APPLICATION FILED AUG. 12, 1910.
1,018,874. Patented Feb. 27, 1912.
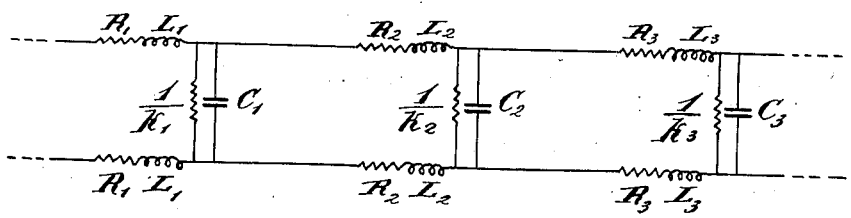

UNITED STATES PATENT OFFICE.

GINO CAMPOS, OF MILAN, ITALY.

MEANS FOR THE PROTECTION OF ELECTRICAL INSTALLATIONS FROM EXCESS VOLTAGES.

1,018,874.  Specification of Letters Patent.  Patented Feb. 27, 1912.

Application filed August 12, 1910. Serial No. 576,862.

*To all whom it may concern:*

Be it known that I, GINO CAMPOS, electrical engineer, subject of the Emperor of Austria-Hungary, residing at Milan, Italy, have invented certain new and useful Improvements in Means for the Protection of Electrical Installations from Excess Voltages, of which the following is a specification.

The present invention has for its object the protection of electrical installations from excess voltages due to sudden alterations of the electrical conditions in the conductors, or which may result from alternating currents and oscillatory currents of high periodicity and also from electrical wave-fronts which propagate themselves quickly along the conductor. All these phenomena may have their origin either inside or outside the installation and be caused for example by atmospheric discharges, by resonances between the various parts of the installation in normal operation, or by accidental phenomena in the installation itself.

In accordance with the present invention excess voltage along the conductors or electrical lines is prevented by wasting the energy of the said excess voltages by means of suitable devices arranged in their path and thereby reducing their amplitude in order to bring them more or less stepwise to a harmless value without impeding the normal current of any character operating in the said conductors and without impairing the properties of the line for practical use.

In the following description a line consisting of two conductors is always considered illustrated and will be used referentially, but it will be understood that in the case of lines composed of a number of conductors each pair of them, or each one of them and the earth must be separately considered.

The accompanying drawing represents a diagram of such a line.

$R_1$, $R_2$, $R_3$ represent the values of the resistance. $L_1$, $L_2$, $L_3$ represent the values of the inductance. $K_1$, $K_2$, $K_3$ represent the values of the conductance. $C_1$, $C_2$, $C_3$ represent the values of the capacity for the length unit of the various successive lengths of line. If these elements are not uniformly distributed along the line they are to be replaced by convenient values, as is usual with such technical problems, which work out uniformly on a given length of line. Generally speaking, therefore for a given length of line the corresponding values relating to the unit of length are designated R, L, C, K. In addition to this it should be stated that R not only indicates the ohmic resistance but also the equivalent resistance, that is to say the resistance which corresponds to the total consumption of energy arising owing to the line current. Similarly K indicates not only the ordinary conductance in shunt to the line but also the equivalent conductance which corresponds to the total consumption of energy caused by the voltage or by shunt current, whether the current is an effective current or a displacement current. L and C designate the inductance and the capacity which correspond to the total energy which has accumulated in the medium owing to series current in the first case and to the voltage or the shunt current in the second case. The propagation of the electrical effects along such a circuit is, as is known, dependent upon the values R, L, K, C; and is increasingly damped with the increase of R and L. In the present case of the propagation of the excess voltages along the electrical conductors, it is frequently a question of more or less complicated waves in which the conditions of the frequency and of the line constants permit of employing the damping co-efficient —$w$— equal to $$\tfrac{1}{2}\left(\frac{R}{L}+\frac{K}{C}\right)$$

with a sufficient degree of approximation. From this equation it is evident that in the cases in question the damping increases with the increase of the equivalent resistance and of the equivalent conductance, of course on condition that L and C remain unaltered or increase but slowly, and even more in the case that they decrease.

In the most general case the increase of damping, as is known, that is to say the propagation of the electrical alternations or oscillations, is prevented by increasing the loss of energy along their path, whether in series or in shunt or simultaneously in both methods of wasted energy. When, however, the values of R and K are increased only by increasing, also for the normal working currents, the ohmic or the equivalent resistance of the line wires, or when in a similar manner the loss of energy is increased in the parallel connection for these currents also, then, in view of the fact that a considerable increase in the damping of the excess voltages can only be attained by a corresponding and considerable increase in the values of R and K, the normal working of the lines is altered, impaired or even prevented; as a result no practical purpose could be served in this way. Further, the desired result can not be attained when the values of L and C increase to such an extent that they oppose the action of the increase of R and K.

The present invention resides in the arrangement of coördinate instrumentalities which are adapted to increase the damping co-efficients and therefore the damping itself for all frequencies or for a part only, and particularly for frequencies which fluctuate between 5,000 and 5,000,000 periods per second and correspond to the excess voltages, greater than in the ordinary lines that are not provided with these devices. Inasmuch as these frequencies, which are higher than those of normal working current, the loss of energy in series and in shunt or in one only of these kinds of connection is considerably increased without excessively increasing the values of L and C, that is, without preventing the desired effect or impairing the operation of the installation and the features of the invention contemplate the reduction of these values as much as possible for the frequencies in question.

The possible arrangements complying with the conditions set forth above without preventing or impeding the normal working of the installation are very diverse. Among these arrangements those must also be considered in which the loss of energy is further increased by the Joule effect, which result can be attained by increasing the effect of the superficial flow or the "skin effect" which, however, also in ordinary lines opposes the propagation of the excess voltages, in the conductors or also by producing by the current itself, both in the conductors and also by its external action, further losses of energy as a result of the introduction of Foucault currents or the radiation of energy in the conductors connected directly or indirectly with the line. Then again arrangements can be employed in which by the magnetic or the electric hysteresis in the magnetic or in the electric substances or by other similar phenomena the line current itself is able to cause directly or indirectly a loss of energy increasing with the frequency. Similarly as regards the alteration of K, arrangements can be employed which are connected in shunt between the line wires and which owing to the dielectric or magnetic hysteresis cause losses of energy which increase with the increase of the frequency or frequencies in question and thereby also increase the values of K. Similarly arrangements can be employed which considerably increase with the frequency the losses between the line wires or between conductors connected with the latter without thereby producing a condition of discharge. This object is also attained by devices which produce in the circuits connected in shunt between the line wires, losses of energy which increase with the frequency and owing to the Joule effect in the conductors of said circuits. In each separate case in practice one or more different devices can be employed and likewise devices which present one or more of the said properties. These devices can be arranged in the line of installation in a more or less uniform kind, or be combined at separate points or lengths along the whole line or only a part of it, at greater or lesser intervals, and be applied to all the wires or only some of them. The difference between the present invention and the other systems devised for protecting from excess voltages resides particularly in the fact that instead of combating the excess voltages by an arrangement which reflects or deflects the electric waves or forms a more or less direct branching of these waves among the wires or the wires and the earth near the points to be protected, the present invention takes into account the manner and the means by which the excess voltages are damped along their path in a more or less uniform manner as the corresponding energy is harmlessly dissipated by intentionally caused losses, and at the same time it permits of the free flow of continuous or alternating current for normal working along the conductors.

What I claim and desire to secure by Letters Patent of the United States is:—

1. In means for protecting electric installations from excess voltages, the combination with conductors, of artificial means for increasing the dampings of the excess voltages at the corresponding frequencies without appreciably altering the values of the inductance and the capacity for the currents which correspond to the normal working of the installation.

2. In means for protecting electric installations from excess voltages, the combination with conducting devices and a condenser, of damping means embodying ohmic resistances, and coils connected thereto and operating to absorb the energy of the oscillatory excess voltages and arranged successively along the conductors to dissipate the energy of the high frequency currents, as and for the purpose specified.

In testimony whereof I affix my signature in presence of two witnesses.

GINO CAMPOS.

Witnesses:
ENRICO VENWELTY,
CHAS. H. LEISCHER.